US012795060B1

(12) United States Patent
Ho et al.

(10) Patent No.: US 12,795,060 B1
(45) Date of Patent: Nov. 10, 2026

(54) UNDERWATER STEREOSCOPIC DUAL CAMERA SYSTEM WITH IMAGE FRAME SYNCHRONIZATION

(71) Applicant: DeepWater Exploration Inc., San Diego, CA (US)

(72) Inventors: Jiajer Ho, San Diego, CA (US); Kunal Singla, San Diego, CA (US); Brandon Stevens, San Diego, CA (US)

(73) Assignee: DeepWater Exploration Inc., San Diego, CA (US)

( * ) Notice: Subject to any disclaimer, the term of this patent is extended or adjusted under 35 U.S.C. 154(b) by 0 days.

(21) Appl. No.: 19/535,227

(22) Filed: Feb. 10, 2026

(51) Int. Cl.

| | |
|---|---|
| ***H04N 13/296*** | (2018.01) |
| ***H04N 13/111*** | (2018.01) |
| ***H04N 13/167*** | (2018.01) |
| ***H04N 13/239*** | (2018.01) |
| ***H04N 13/246*** | (2018.01) |
| ***H04N 13/257*** | (2018.01) |
| ***H04N 23/50*** | (2023.01) |
| ***H04N 23/51*** | (2023.01) |

(52) U.S. Cl.
CPC ......... *H04N 13/296* (2018.05); *H04N 13/111* (2018.05); *H04N 13/167* (2018.05); *H04N 13/239* (2018.05); *H04N 13/246* (2018.05); *H04N 13/257* (2018.05); *H04N 23/51* (2023.01); *H04N 23/555* (2023.01)

(58) Field of Classification Search
None
See application file for complete search history.

(56) References Cited

U.S. PATENT DOCUMENTS

2021/0037229 A1* 2/2021 Maykol Gomes Pinto ................. H04N 13/271
2022/0094884 A1* 3/2022 Kerr ....................... H04N 7/181
2025/0287087 A1* 9/2025 Hill ....................... H04N 23/51

FOREIGN PATENT DOCUMENTS

CN 108459400 A * 8/2018 ............ G02B 13/22

* cited by examiner

*Primary Examiner* — Heather R Jones
(74) *Attorney, Agent, or Firm* — Cognition IP, P.C.; Edward Steakley

(57) ABSTRACT

An underwater stereo imaging system with a first submersible camera and a second submersible camera. The first camera and the second camera are arranged in a fixed stereo baseline and have an overlapping field of view of an underwater environment while the underwater stereo imaging system is submersed in the underwater environment. Both the first camera and the second camera share a common voltage bus that when a predetermined voltage is applied to the common voltage bus, the first image sensor and the second image sensor are triggered to generate an image frame depicting an underwater environment. The cameras have an onboard clock used to provide a time stamp for generated image frames. An image frame matching process may be performed to match image frame from the first and second camera to create matched image pairs.

22 Claims, 6 Drawing Sheets

UNDERWATER STEREOSCOPIC DUAL CAMERA SYSTEM WITH IMAGE FRAME SYNCHRONIZATION

CROSS-REFERENCE TO RELATED APPLICATIONS

None.

FIELD

The application relates generally to the image acquisition systems, and more particularly to an underwater stereoscopic dual camera system with image frame synchronization for stereoscopic image generation.

SUMMARY

An underwater stereo imaging system with a first submersible camera and a second submersible camera. The first camera and the second camera are arranged in a fixed stereo baseline and have an overlapping field of view of an underwater environment while the underwater stereo imaging system is submersed in the underwater environment. Both the first camera and the second camera share a common voltage bus that when a predetermined voltage is applied to the common voltage bus, the first image sensor and the second image sensor are triggered to generate an image frame depicting an underwater environment. The cameras have an onboard clock used to time stamp the images. An image frame matching process may be performed to match image frame from the first and second camera to create matched image pairs.

In some embodiments, the first camera has a first submersible housing with a first image sensor, a first processor, a first clock, and a first corrective optic system disposed within the first submersible housing. The first camera has a second submersible housing with a second image sensor, a second processor, a second clock, and a second corrective optic system disposed within the second submersible housing. The first camera and the second camera are arranged in a fixed stereo baseline and have an overlapping field of view of an underwater environment while the underwater stereo imaging system is submersed in the underwater environment. Examples of the first clock and/or second clock may include any one or more of the following: an oscillator, timing chip, signal generator, trigger generator, or other electronic component used for timing.

In some embodiments, the system performs an image frame synchronization process that synchronizes a set of image frames generated by an image sensor of the first camera with a set of images generated by an image sensor of the second camera. The synchronization process creates a matched pair of image frames that are used to generate a composite stereo image depicting a stereoscopic view of an underwater environment.

Furthermore, the appended claims may serve as a summary of this application.

DETAILED DESCRIPTION OF THE DRAWINGS

Figure 1:
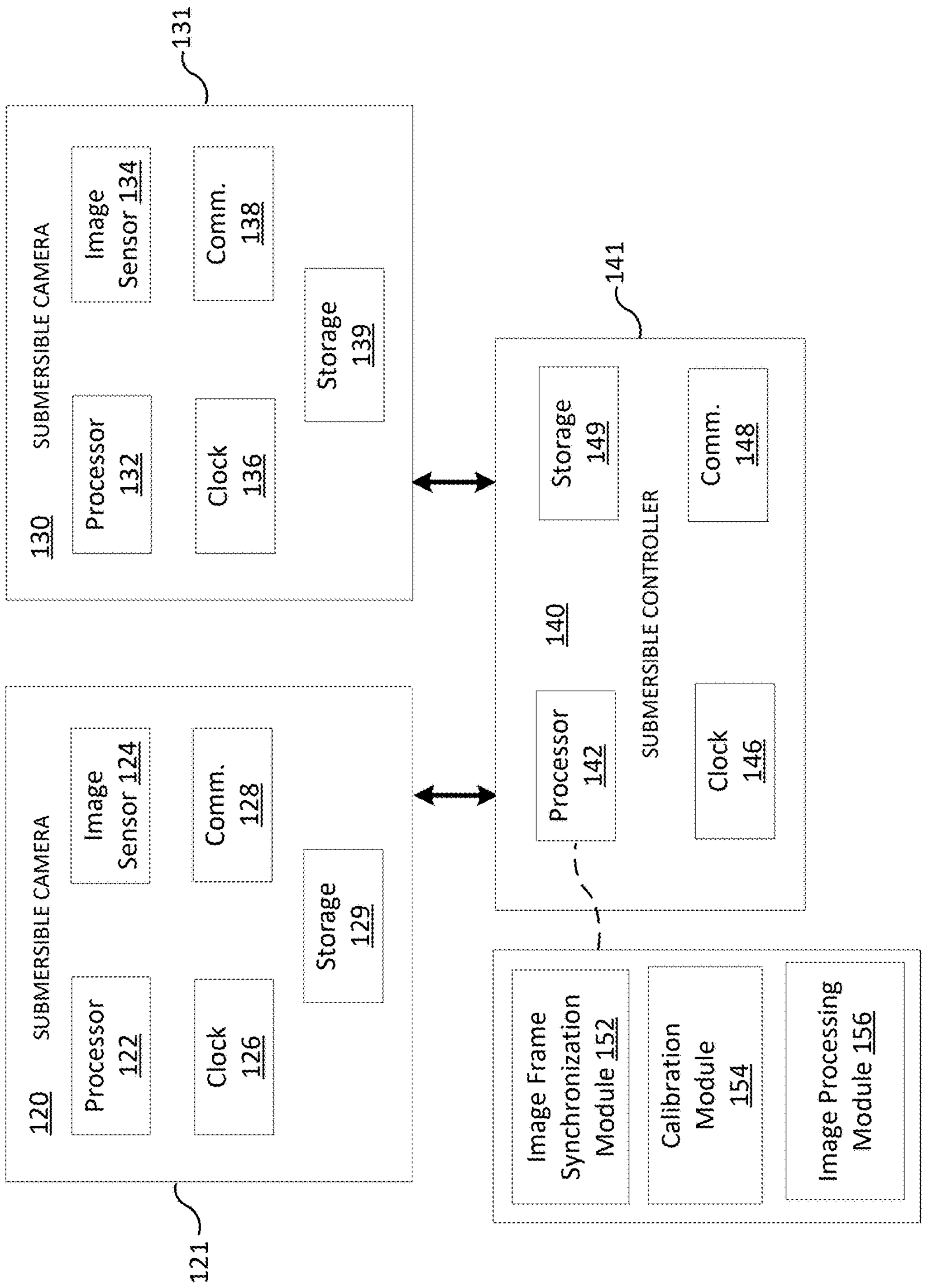
FIG. 1 is a block diagram illustrating an example of an underwater stereoscopic dual camera system according to some embodiments.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well-known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially.

Underwater Stereoscopic Dual Camera System

FIG. 1 is a block diagram illustrating an example of an underwater stereoscopic dual camera system according to some embodiments.

The underwater stereoscopic dual camera system 100 includes two separate cameras that obtain image frames in an underwater environment. The two cameras are placed in a mounting position with a fixed distance between the two cameras.

In some embodiments, a first camera 120 includes a first submersible housing 121, a first image sensor 124 disposed within the first submersible housing 121, a first clock 126, and a first corrective optic system 123. The second camera 130 includes a second submersible housing 131, a second image sensor 134 disposed within the second submersible housing 131, a second clock 136, and a second corrective optic system 133. The first camera and the second camera are arranged in a fixed stereo baseline.

In some embodiments, the first submersible housing 121 and the second submersible 131 housing are fixed to a mounting bracket 106 that holds the first camera 120 and the second camera 130 in the fixed stereo baseline. In other embodiments, the first submersible housing 121 and the second submersible housing 131 are mounted directly to a part of an underwater vehicle (such as a submersible remotely operated vehicle).

In some embodiments, the underwater stereoscopic dual camera system 100 includes a controller 140. The controller 140 has a submersible housing 141 where a processor 142, clock 146, communications circuitry 148 and storage media 149 are disposed. In some embodiments, the first camera 120 and the second camera 130 are communicatively wired to the controller 140.

Figure 2A:
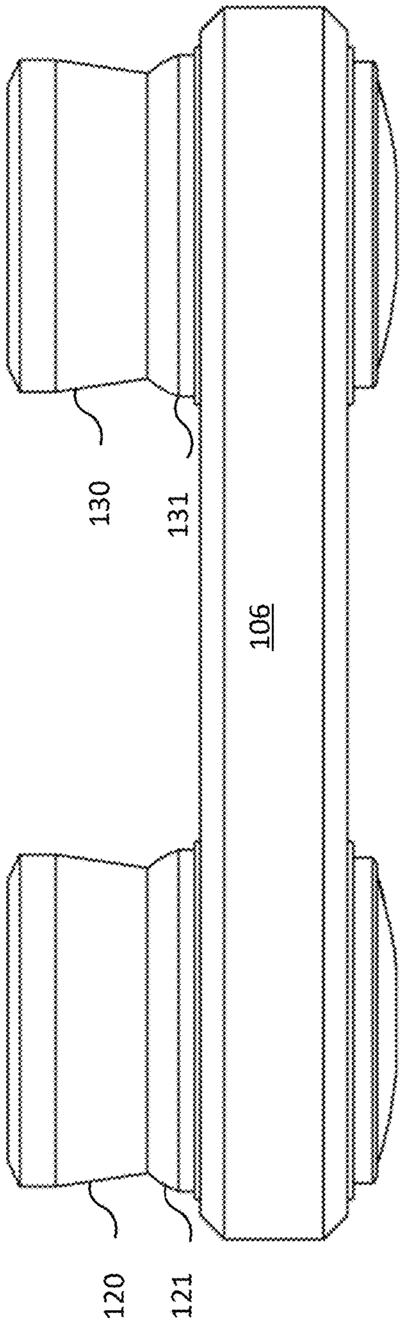
FIGS. 2A-2B are diagrams illustrating an example of a top view and front view of the underwater stereoscopic dual camera system according to some embodiments.
Figure 2B:
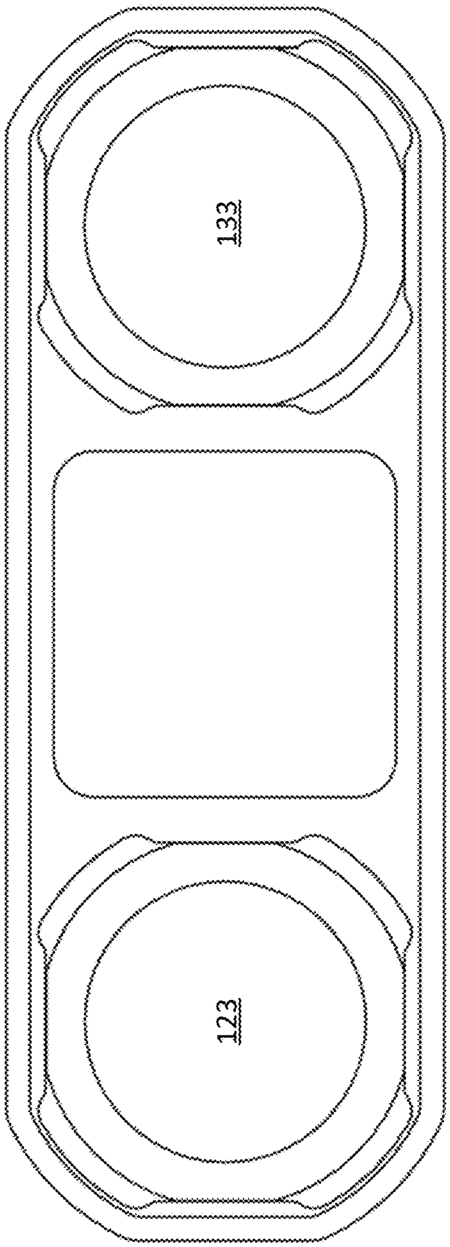

FIGS. 2A-2B are diagrams illustrating an example of a top view and front view of the underwater stereoscopic dual camera system according to some embodiments.

Figure 3A:
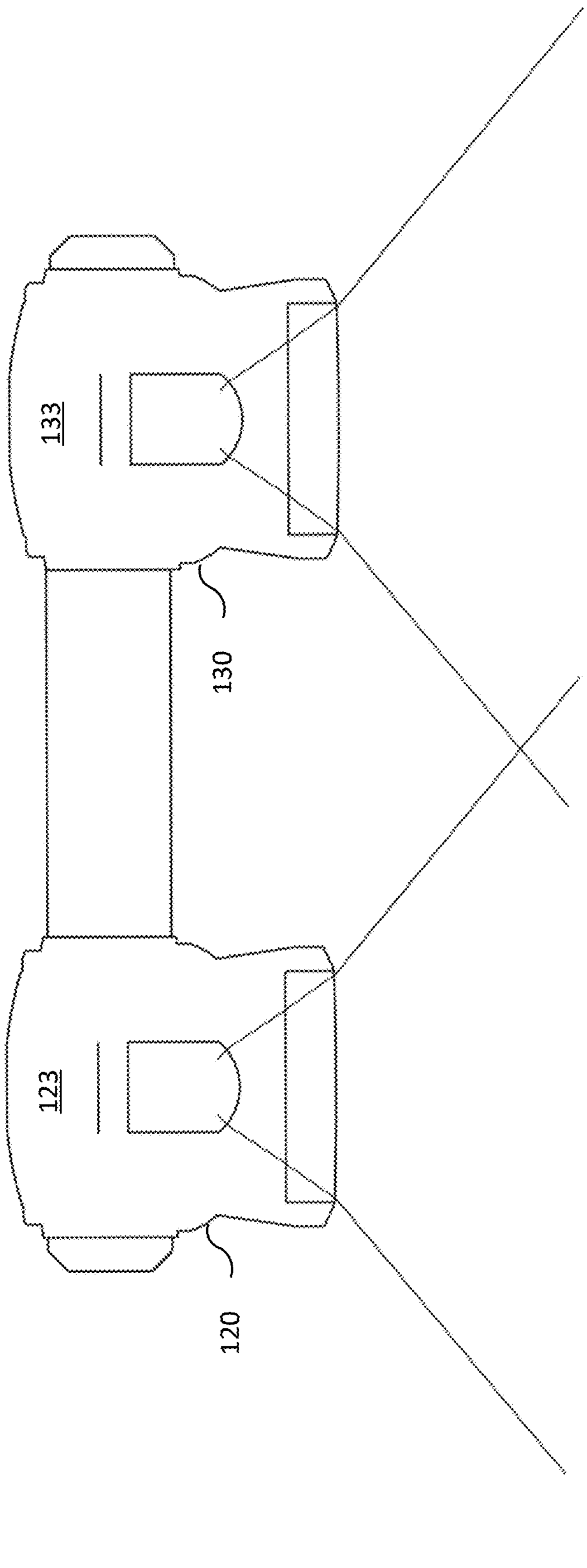
FIGS. 3A-3B are diagrams illustrating field of view of the underwater stereoscopic dual camera system according to some embodiments.
Figure 3B:
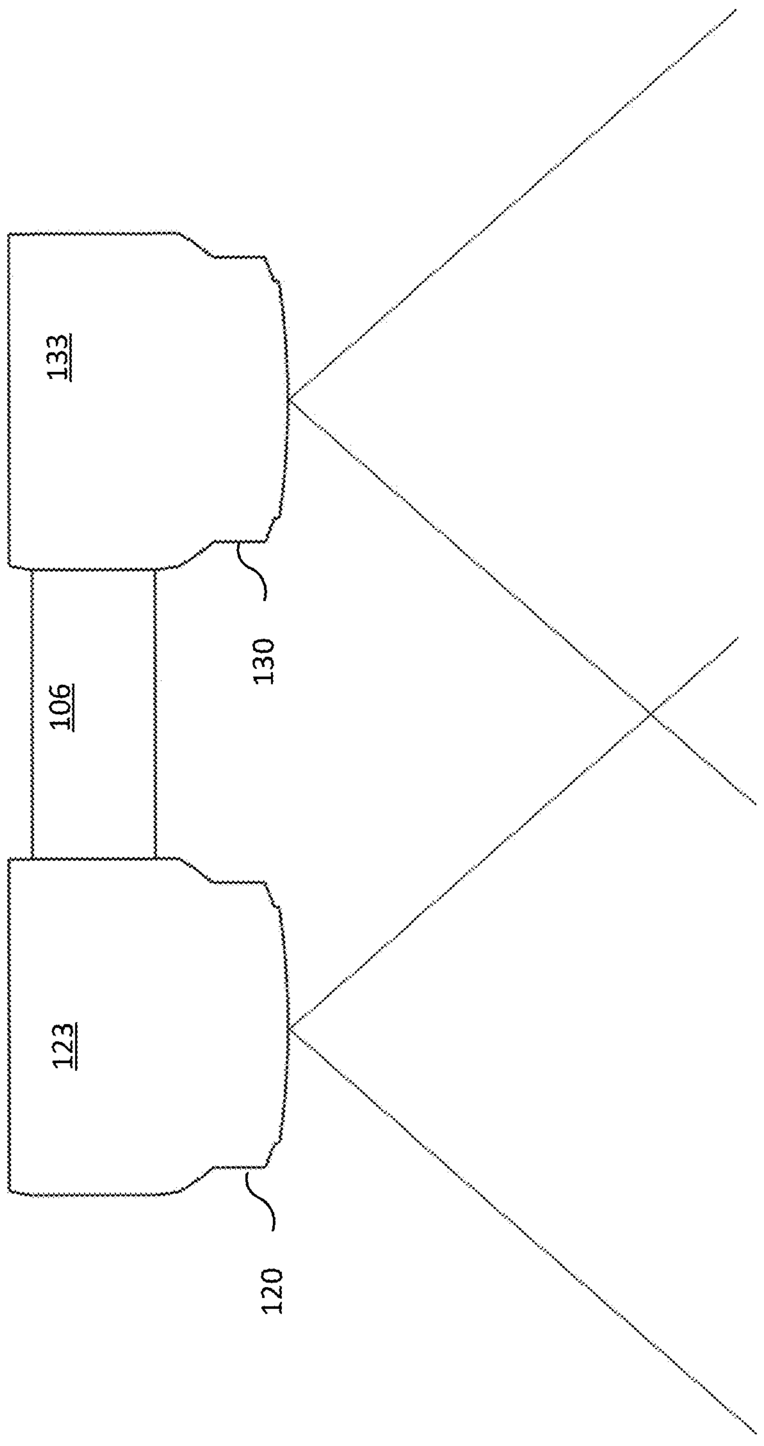

FIGS. 3A-3B are diagrams illustrating field of view of the underwater stereoscopic dual camera system according to some embodiments.

In some embodiments, each camera includes optics that optically corrects for underwater field distortion and chromatic aberration. An example optic system of the camera may be found in U.S. Pat. No. 12,321,085 titled Submersible Camera For Underwater Vehicles. In some embodiments, the cameras use all-glass lenses that correct underwater distortion.

Image Acquisition and Synchronization Process

Figure 4:
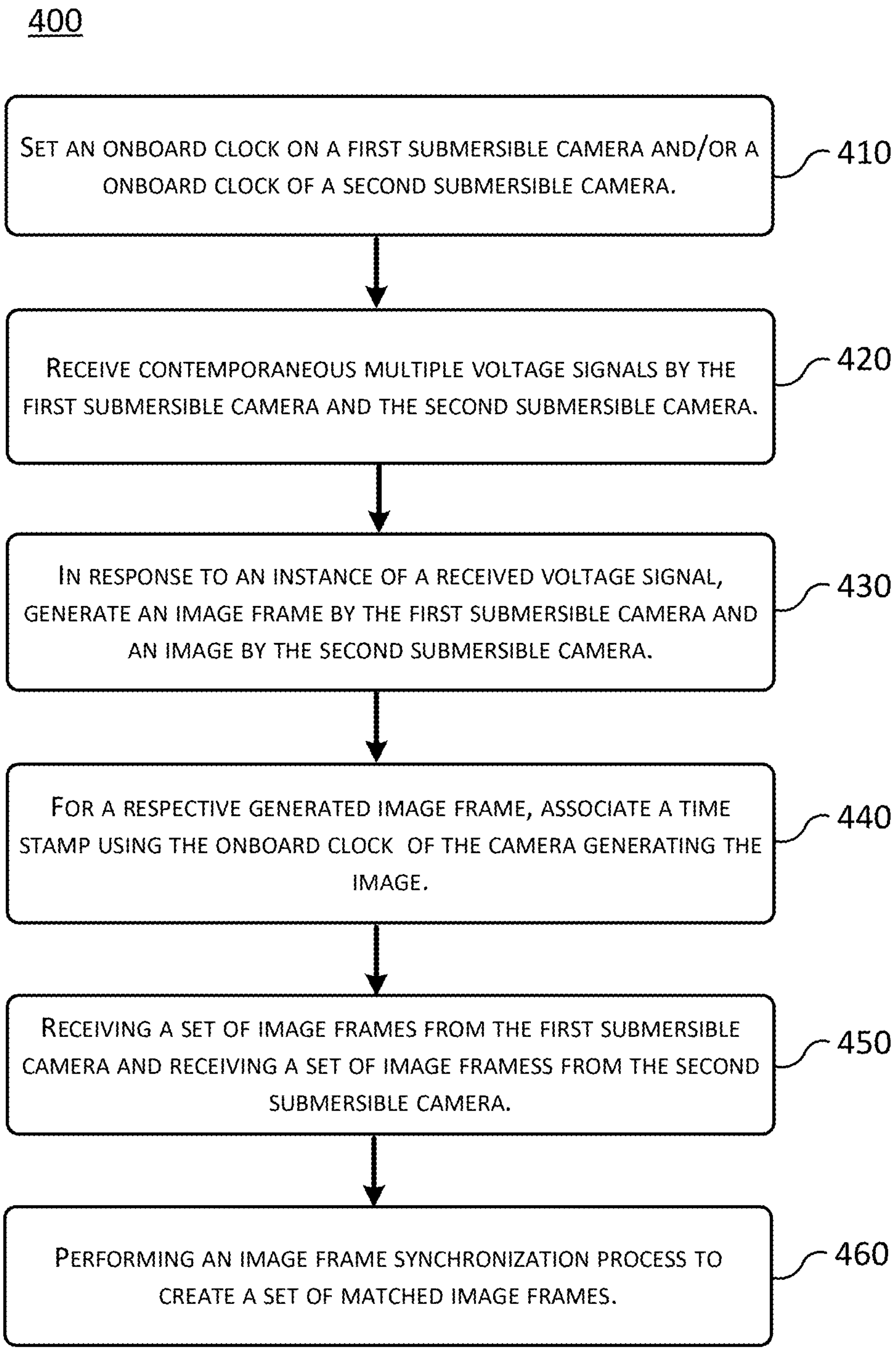
FIG. 4 is a flowchart illustrating an example process of image acquisition and image frame synchronization process.

FIG. 4 is a flowchart illustrating an example image acquisition and synchronization process 400. The synchronization process matches image frames for a first set of image frames obtained by the first camera with a second set of image frames obtained by the second camera. The synchronization process is especially useful to match or align a series of image frames where the image frames do not have an identical or corresponding time stamp.

In step 410, an onboard clock 126, 136 of a first submersible camera 120 and a second submersible camera 130 are set.

In step 420, each of the first submersible camera 120 and the second submersible camera 130 receive multiple sync signals (such as a contemporaneous voltage signal provides on a common voltage line). In some embodiments, the first camera and the second camera share a common voltage bus that when a predetermined voltage is applied to the common voltage bus triggers (e.g., a trigger signal) both the first image sensor and the second image sensor to generate an image. In response to the initiated plurality of periodic voltages, the first set of image frames is generated by the first camera, and a second set of image frames is generated by the second camera. In some embodiments, the first camera and the second camera receive a signal to align the time of the first clock and the second clock.

During operation of each of the first submersible camera 120 and the second submersible camera 130, the respective image sensors periodically obtain image frames. The respective captured image frames are time-stamped based on the clock time of the camera's clock. For example, a first image sensor in a first submersible housing and a second image sensor in a second submersible housing capture a synchronized pair of stereo image frames of an underwater environment. The first and second housings are held in a fixed stereo baseline.

Light passes from the underwater environment through a first corrective optic system before the light reaches a first image sensor and a second corrective optic system before the light reaches the second image sensor. In some embodiments, each corrective optic is a freeform, water-contact optical element that corrects for underwater field distortion and chromatic aberration to restore a native in-air field of view and edge sharpness in the captured stereo images. In other embodiments, a standard above water lens can be used paired with corrective optic systems that reduces chromatic aberration while maintaining FOV and field curvature. The configuration of the cameras also enables the system to accurately stereo match to the periphery of the field of view of the cameras.

In some embodiments, the captured image frames are initially processed by a respective camera's on-board processor. The processing of the image frame is performed prior to the image frames being transmitted from the respective cameras. The initial image processing reduces data bandwidth and further computation. For example, the initial image processing may include one or more image processing operations applied to image frames before compression, such as: auto exposure, auto white balancing and/or demosaicing.

In step 430, in response to receiving an instance of the contemporaneous trigger signal, an image is generated by an image sensor 124 of the first submersible camera 120 and another image is generated by an image sensor 134 of the second submersible camera 130.

During the course of receiving the trigger signals, the image frames generated by the respective image sensors 124, 134 are time-stamped and stored in a local data store 129, 139 of the respective cameras. In other words, each of the cameras receives a contemporaneous signal to activate an image sensor. In some embodiments, the first camera 120 and the second camera 130 share a common channel/wire where a voltage signal is provided such that each of the cameras 120, 130 contemporaneously capture an image via their respective image sensors.

In step 440, for a respective generated image, a time stamp using a respective onboard clock 126, 136 is associated with the respective generated images. Multiple image frames are generated by each of the image sensors 124, 134, timestamped and stored in a local data store or memory of each camera 120, 130.

The contemporaneous trigger signal is meant to capture an image pair, with the first camera 120 obtaining a first image and the second camera 130 obtaining a second image. Multiple contemporaneous image signals are sent to each of the cameras 120, 130, thereby causing the cameras to obtain image pairs with one image of the image pair being time-stamped with a clock time from clock 126 and stored on the first camera 120, and the other image of the image pair being timestamped with a clock time from clock 136 and stored on the second camera 130. The acquired image frames are stored and/or buffered in the respective storage 129, 139 of the cameras 120, 130.

In step 450, a set of image frames from the first submersible camera is received and a second set of image frames from the second submersible camera is received. In some embodiments, individual or groups of image frames may be proactively transmitted from a camera to another computing device.

In step 460, an image frame synchronization process is performed to create matched pairs of stereoscopic images. In some embodiments, the captured image frames are synchronized to create a matched pair of image frames that are used to generate a composite stereo image obtained from the first camera and an image frame obtained by the second camera.

In some embodiments, a three-dimensional model of the captured image frames is generated using stereoscopic pairs of image frames obtained by the first camera and the second camera. In some embodiments, the captured image frames are processed via an object detection module or process to identify and label objects within the generated three-dimensional model.

Each of the first camera 120 and the second camera 130 have an onboard clock which a respective camera uses for obtaining an image by an image sensor 124, 134. In some embodiments to synchronize the clocks, the first camera 120 is in wired or wireless communication with the second camera 130. The first camera transmits a clock signal to the second camera where the second camera captures the frame. In other embodiments, each clock of the first camera 120 and the second camera receives a clock signal from the submersible controller 140, where each of the first camera 120 and the second camera 130 captures the frame with the received clock signal. After the respective clocks are synchronized, then the image frames obtained by the respective first and second cameras 120, 130 via an onboard computer can have a common date/time stamp when both of the cameras obtain an image when contemporaneously instructed to do so.

In some embodiments, the clock of the first camera and the clock of the second camera are set to common time. However, in some instances, it is possible that the clocks drift apart from one another such that the clocks of the respective first and second cameras 120, 130 may be apart by a number of microseconds or millisecond apart from one another. For example, each of the cameras receive a signal to obtain an image. It is possible that the actual time that the first camera 120 obtains an image via its image sensor 124 is a period of time slightly before or after the other the second camera 130 obtains an image via its image sensor 134. The camera's may receive multiple signals to obtain images. During the course of receiving the signals, the image frames generated by the respective image sensors 124, 134 are time stamped and stored in a local data store 129, 139 of the respective cameras. In other words, each of the cameras receive a contemporaneous signal to activate an image sensor. The contemporaneous image capture signal is meant to capture an image pair, with the first camera 120 obtaining a first image and the second camera 130 obtaining a second image. Multiple contemporaneous image signals are sent to each of the cameras 120, 130, thereby causing the cameras to obtain image pairs with one image of the image pair being timestamped with a clock time from clock 126 and stored on the first camera 120, and the other image of the image pair being timestamped with a clock time from clock 136 and stored on the second camera 130. The acquired image frames are stored and/or buffered in the respective storage 129, 139 of the cameras 120, 130.

In some modes of operation, an image frame synchronization module 152 performs a process to match up or pair a first set of image frames received from the first camera 120 and a second set of image frames received from the second camera 130. The synchronization module may be performed via the processor of the submersible controller or some other computing device or computer server.

In some instances, the first set of image frames includes a number of image frames where an image has a time stamp that identically matches a time stamp of image frames in the second set of images. The image frame synchronization module 152 pairs the image frames with the exact time stamps together in a matched image pair and then matches any preceding image frames or following image frames together as other matched image frames pairs. The resulting output of the image is a set of image pairs that are matched together which from the stereoscopic image pair.

In some instances, the first set of image frames does not include any image frames where an image has a time stamp that identically matches a time stamp of an image in the second set of images. In this situation, the image frame synchronization module identifies a first image frame from the first set of image frames to pair or match with an image from the second set of images. In this instance, it is possible that the first image is matched with a first image, second image or third image, etc. from the second set of images. An image offset number is determined by the image frame synchronization module 152 and is used to pair subsequent image frames of the first set of image frames with the second set of images. For example, if the first image of the first set of image frames is paired with the first image of the second set of images, then the offset number would be 0. In another example, if the first image of the first set of image frame is paired with the second image of the second set of images, then the offset number would be 1.

In some embodiments, the synchronization module 152 performs the operation of selecting an image frame from the first set of image frames obtained by the first camera and an image frame from the second set of image frames obtained by the second camera. In some embodiments, the synchronization module 152 finds a first occurrence of corresponding image frames that have an identical time stamp and then selects each of those image frames as a selected image frame as a base pair of image frames to match other image frames from the first set and the second set. In some embodiments, the image frame synchronization module 152 finds a first occurrence of corresponding image frames that have a least amount of time difference in their time stamps, and then selects each of those image frames as a selected image frame as a base pair of image frames to match other image frames from the first set and the second set.

The image frame synchronization module 152 pairs the selected image frame from a first set of image frames obtained by the first camera, with the selected image frame from a second set of image frames obtained by the second camera. The image frame synchronization module 152 matches in serial order subsequent image frames after the image frame from the first set of image frames with subsequent image frames after the image frame from the second set of image frames, thereby creating a set matched image frame pairs.

In some embodiments, the selected image frame from the first set of image frames has a time stamp value that has a same time stamp or is within a predetermined time range of the selected image frame from the second set of image frames. In the event that the image frames are not within a predetermined time of with another (such as a n milliseconds), then the image frames will not be paired with one another even though they are in respective sequential order from the selected image frame from the first set of image frames with the second set of image frames. In instances it is possible then that an image frame from either the first set or the second set is not matched. If this occurs, then the image frame is effectively not used then to create a matched image frame pair.

In some embodiments, the two frames are taken from the two cameras. If a left frame is ahead of right frame by more than 1 frame interval, the system drops the right frame and lets the buffer move to align to a newer right frame with the left frame. If right frame is ahead of left, same thing occurs, but in reverse.

We determine two frames to be in synchronization when they are aligned to within 1 frame interval (1 divided by the frames per second). This is because of the hardware synchronization.

In some embodiments, image frame synchronization module 152 matches in reverse serial order preceding image frames with a time stamp before the selected image frame from the first set of image frames with preceding image frames have a time stamp before the selected image frame from the second set of image frames, thereby creating a set matched image frame pairs.

In some embodiments, the image frame synchronization module 152 matches in reverse serial order preceding image frames with a time stamp before the selected image frame from the first set of image frames with preceding image frames having a time stamp before the image frame from the second set of image frames, thereby creating a set matched image frame pairs.

In some embodiments, the image frame synchronization module 152 performs an image pair validation process to assess whether the images would generate a quality stereo image. For example, the system may evaluate each image of the pair and determine if there are pixel blurring in either image that would not be conducive to a quality stereo image. In such cases, the system may reject the matched image frame pairs and would not generate a stereo image from the matched image frame pair.

In some embodiments, a controller of the underwater stereo image system performs the image frame synchronization process via the synchronization module. The controller comprises a submersible housing, a processor disposed within the submersible housing, and an image storage repository disposed within the third submersible housing.

The first camera and second camera are communicatively wired to the controller. The controller wherein the controller performs the operations of initiating a plurality of periodic voltages to a common voltage bus. The controller receives a first set of image frames from the first camera and a second set of image frames from the second camera. The controller may be configured to perform synchronization of the first set of image frames with the second set of image frames. In some embodiments, the first camera and the second camera receive a frame sync signal pulse to perform the synchronization.

In some embodiments, a three-dimension stereoscopic image and/or three-dimensional model is generated by the system. An x, y, z coordinates from the frame sensors to objects in the three-dimensional image or model may be calculated. Coordinates of the location of the objects may then be transmitted from the system to an underwater vehicle, and the computer system provides navigation data to the vehicle with respect to external objects in the underwater environment in relation to the source location of the underwater stereo imaging system.

First Camera and Second Camera Calibration Process

Figure 5:
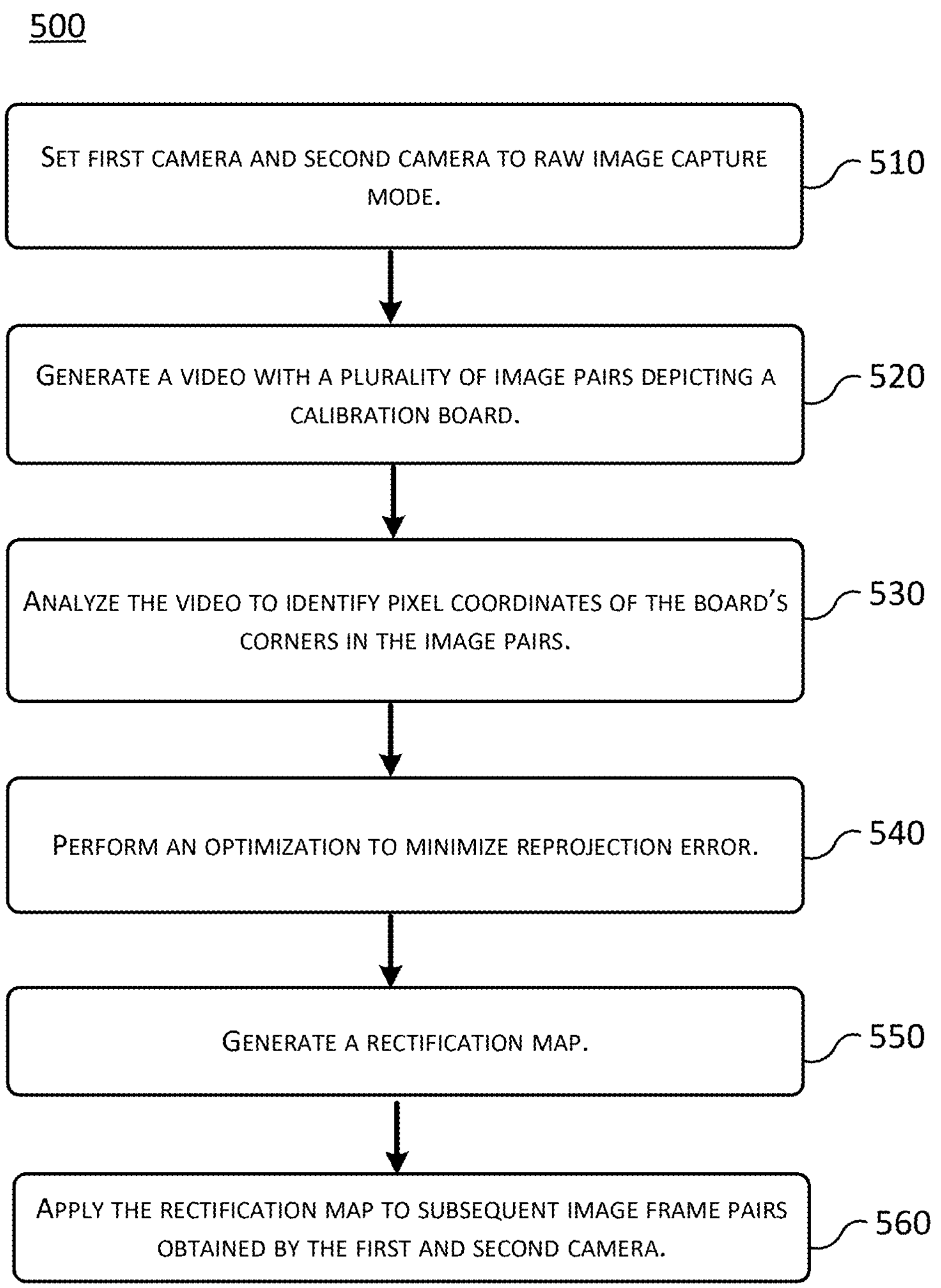
FIG. 5 is a flowchart illustrating an example calibration process of the underwater stereoscopic dual camera system according to some embodiments.

FIG. 5 is a flowchart illustrating an example calibration process of the underwater stereoscopic dual camera system according to some embodiments.

In step 510, the method begins by configuring a plurality of image sensors to an image capture mode. This mode is selected to ensure high-quality data generation, avoiding compression artifacts that could blur the sharp lines or features of the reference calibration target.

In step 520, calibration image data is obtained, comprising a sequence of images capturing a calibration target. Markers on the target provide orientation data for accurate stereo camera calibration. During the acquisition of the image sequence, the calibration target (e.g., calibration board) is moved throughout the field of view of the plurality of sensors, allowing them to capture images of the target at a variety of distances, angles, and positions. This diverse dataset is used by the process to solve for the camera parameters robustly. Video is generated having a plurality of pairs of images, by the first camera and the second camera along with image metadata, where each image depicts the calibration target. Markers in each cell of the board provide absolute 3D orientation for accurate stereo camera calibration. During the generation of the plurality of pairs of images, the calibration target is moved throughout the field of view of both cameras where the cameras capture images of the calibration target at a variety of distances, angles, and positions. This rich dataset is used by the process to solve for the camera parameters robustly.

In step 530, the system analyzes the calibration image data to detect feature points associated with the calibration target within the images. This step identifies the pixel coordinates of the target's distinct features (such as corners or markers) within the image frames captured by the sensors. The plurality of pairs of image frames and the metadata are analyzed. This step identifies the pixel coordinates in the image frames of the board's corners in both the left and right image frames for each video frame.

In step 540, an optimization process is performed to determine calibration parameters based on the detected feature points. This optimization seeks to minimize a deviation metric (e.g., the difference between the observed feature locations and the locations predicted by a mathematical model). The resulting parameters include intrinsic values (such as focal lengths and optical centers) and distortion coefficients for each lens, as well as extrinsic parameters (rotation and translation) that map the coordinate systems of the sensors to one another. The optimization process is performed to find the camera calibration parameters that minimize a reprojection error (e.g., the distance between the observed corner locations and the locations predicted by a mathematical camera model.)

In step 550, based on the calibration parameters, image correction data is generated. This data is used to compute correction profiles. This correction process computationally transforms the raw images from the sensors. The transformation aligns the images, for example, making it appear as though the sensors have perfectly parallel image planes. This simplifies the problem of finding corresponding points between the different views, making subsequent processing tasks faster and more reliable. Once the calibration parameters are successfully calculated, they are used to compute and generate rectification maps.

Rectification is a process that computationally "warps" the raw images from both cameras. The transformation makes it seem as though the two cameras have perfectly parallel image planes. This simplifies the problem of finding corresponding points between the two views. After rectification, a point in the left image will appear on the exact same horizontal line (i.e., the epipolar line) in the right image, making 3D reconstruction algorithms much faster and more reliable.

In step 560, the image correction data is applied to subsequent images captured by the plurality of image sensors. The correction profiles are applied to any future video streams, recordings, or image pairs for the stereo imaging system. The rectification maps are then applied to calibration to any future video streams or recordings, or image pairs for the underwater stereo imaging system 100.

It will be appreciated that the present disclosure may include any one and up to all of the following examples.

Example 1. An underwater stereo imaging system, comprising: a first camera comprising: a first submersible housing; a first image sensor disposed within the first submersible housing; a first processor; a first clock; and a first corrective optic system; a second camera comprising: a second submersible housing; a second image sensor disposed within the second submersible housing; a second processor; a second clock; and a second corrective optic; and a common voltage bus; wherein the first camera and the second camera are arranged in a fixed stereo baseline and have an overlapping field of view of an underwater environment while the underwater stereo imaging system is submersed in the underwater environment; wherein both the first camera and the second camera share the common voltage bus that when a predetermined voltage is applied to the common voltage bus triggers both the first image sensor and the second image sensor to generate an image; wherein each of the first corrective optic and second corrective optic are each a water-contactable optical element that optically corrects for underwater field distortion and chromatic aberration; and a synchronization module communicatively coupled to the first camera and the second camera, wherein the synchronization module is configured to synchronize image frames depicting the underwater environment.

Example 2. The system of Example 1, further comprising: a controller comprising: a submersible housing; a third processor disposed within the third submersible housing; an image storage repository disposed within the third submersible housing; wherein the first camera and second camera are communicatively wired to the controller; wherein the third processor performs the synchronization module.

Example 3. The system of any one of Examples 1-2, wherein the synchronization module performs the operation of: pairing an image frame from a first set of image frames obtained by the first camera, with an image frame from a second set of image frames obtained by the second camera; matching in serial order subsequent image frames after the image frame from the first set of image frames with subsequent image frames after the image frame from the second set of image frames, thereby creating a set matched image frame pairs.

Example 4. The system of any one of Examples 1-3, wherein the image frame from the first set has a time stamp value with the image frame from the second set with the same time stamp or are within a predetermined time range with one another.

Example 5. The system of any one of Examples 1-4, wherein the synchronization module performs the operation of: matching in reverse serial order preceding image frames with a time stamp before the image frame from the first set of image frames with preceding image frames with a time stamp before the image frame from the second set of image frames, thereby creating a set matched image frame pairs.

Example 6. The system of any one of Examples 1-5, wherein the first submersible housing and the second submersible housing are fixed to a mounting bracket that holds the first camera and the second camera in the fixed stereo baseline, and wherein the first submersible housing and the second submersible housing mounted to a portion of an underwater vehicle, wherein the first camera and the second camera have an overlapping field of view of an underwater environment while the underwater stereo imaging system is submersed in the underwater environment.

Example 7. The system of any one of Examples 1-6, wherein the first processor and the second processor, each performing initial image processing on image frames generated by the respective image sensors, thereby reducing image transmission bandwidth, wherein the initial image processing comprises at least one of auto exposure, auto white balance and/or demosaicing.

Example 8. The system of any one of Examples 1-7, wherein the first submersible housing further wherein the first and second processor are each configured to perform initial image processing on data from its respective image sensor before transmitting the data to the computer system, thereby reducing bandwidth requirements.

Example 9. The system of any one of Examples 1-8, further comprising: an image model generator module that generates a three-dimensional model of an underwater environment based on image data captured by the first image sensor and the second image sensor.

Example 10. The system of any one of Examples 1-9, wherein the system is integrated with an underwater vehicle, and the computer system is further configured to provide navigation data to the vehicle based on the generated three-dimensional model.

Example 11. A method of operating underwater stereo imaging system, comprising the operations: operating the underwater stereo imaging system comprising: a first camera comprising: a first submersible housing; a first image sensor disposed within the first submersible housing; a first processor; a first clock; and a first corrective optic system; a second camera comprising: a second submersible housing; a second image sensor disposed within the second submersible housing; a second processor; a second clock; and a second corrective optic system; and a common voltage bus; wherein the first camera and the second camera are arranged in a fixed stereo baseline; wherein both the first camera and the second camera share the common voltage bus that when a predetermined voltage is applied to the common voltage bus triggers both the first image sensor and the second image sensor to generate an image; wherein each of the first corrective optic system and second corrective optic system are each a water-contactable optical element that optically corrects for underwater field distortion and chromatic aberration; and initiating a plurality of periodic voltages to be provided to the common voltage bus; in response to the initiated plurality of periodic voltages, obtaining a first set of image frames by the first camera and a second set of image frames by the second camera; and synchronizing the first set of image frames with the second set of image frames.

Example 12. The method of Example 11, wherein the underwater stereo imaging system further comprises: a controller comprising: a submersible housing; a third processor disposed within the third submersible housing; an image storage repository disposed within the third submersible housing; wherein the first camera and second camera are communicatively wired to the controller; wherein the controller performs the operations of: initiating the plurality of periodic voltages to the common voltage bus; receiving the first set of image frames and the second set of image frames; and synchronizing the first set of image frames with the second set of image frames.

Example 13. The method of any one of Examples 11-12, wherein synchronizing the first set of image frames with the second set of image frames comprises: pairing an image frame from a first set of image frames obtained by the first camera, with an image frame from a second set of image frames obtained by the second camera; and matching in serial order subsequent image frames after the image frame from the first set of image frames with subsequent image frames after the image frame from the second set of image frames, thereby creating a set matched image frame pairs.

Example 14. The method of any one of Examples 11-13, further comprising generating a stereo image for each of the set of matched image frame pairs.

Example 15. The method of any one of Examples 11-14, further comprising: initializing the first clock and the second clock to a same time.

Example 16. The method of any one of Examples 11-15, wherein the first submersible housing and the second submersible housing are fixed to a mounting bracket that holds the first camera and the second camera in the fixed stereo baseline, and wherein the first submersible housing and the second submersible housing mounted to a portion of an underwater vehicle.

Example 17. The method of any one of Examples 11-16, further comprising: performing initial image processing on image frames generated by the respective image sensors, thereby reducing image transmission bandwidth, wherein the initial image processing comprises at least one of auto exposure, auto white balance and/or demosaicing.

Example 18. The method of any one of Examples 11-17, further comprising: performing initial image processing by both the first image sensor and the second image sensor on generated image data before transmitting the generated image data to a separate device, thereby reducing bandwidth requirements by reducing the pixel size and/or image file size of the generated image data.

Example 19. The method of any one of Examples 11-18, further comprising: generating a three-dimensional model, via an image generator, of an underwater environment based on the first set of image frames and the second set of image frames.

Example 20. The method of any one of Examples 11-19, further comprising: providing navigational data to an underwater vehicle based on the based on the generated three-dimensional model.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An underwater stereo imaging system, comprising:

a first camera comprising:
  a first submersible housing;
  a first image sensor disposed within the first submersible housing;
  a first processor;
  a first clock; and
  a first corrective optic system;

a second camera comprising:
  a second submersible housing;
  a second image sensor disposed within the second submersible housing;
  a second processor;
  a second clock; and
  a second corrective optic system; and a common voltage bus;

wherein the first camera and the second camera are arranged in a fixed stereo baseline and have an overlapping field of view of an underwater environment while the underwater stereo imaging system is submersed in the underwater environment;

wherein both the first camera and the second camera share the common voltage bus that when a predetermined voltage is applied, from a source other than the first camera and the second camera, to the common voltage bus triggers both the first image sensor and the second image sensor to generate image frames;

wherein each of the first corrective optic system and second corrective optic system are each a water-contactable optical element that optically corrects for underwater field distortion and chromatic aberration; and a synchronization module communicatively coupled to the first camera and the second camera, wherein the synchronization module is configured to receive a first set of image frames and a second set of image frames and then synchronize image frames depicting the underwater environment.

2. The system of claim 1, further comprising:

a controller comprising:
  a submersible housing;
  a third processor disposed within a third submersible housing;
  an image storage repository disposed within the third submersible housing;
  wherein the first camera and second camera are communicatively wired to the controller;

wherein the third processor performs the synchronization module.

3. The system of claim 1, wherein the synchronization module performs the operation of:

pairing an image frame from the first set of image frames obtained by the first camera, with an image frame from a second set of image frames obtained by the second camera;

matching in serial order subsequent image frames after the image frame from the first set of image frames with subsequent image frames after the image frame from the second set of image frames, thereby creating a set matched image frame pairs.

4. The system of claim 3, wherein the image frame from the first set has a time stamp value with the image frame from the second set with the same time stamp or are within a predetermined time range with one another.

5. The system of claim 4, wherein the synchronization module performs the operation of:

matching in serial order preceding image frames with a time stamp before the image frame from the first set of image frames with preceding image frames with a time stamp before the image frame from the second set of image frames, thereby creating a set matched image frame pairs.

6. The system of claim 1, wherein the first submersible housing and the second submersible housing are fixed to a mounting bracket that holds the first camera and the second camera in the fixed stereo baseline, and wherein the first submersible housing and the second submersible housing mounted to a portion of an underwater vehicle, wherein the first camera and the second camera have an overlapping field of view of an underwater environment while the underwater stereo imaging system is submersed in the underwater environment.

7. The system of claim 1, wherein the first processor and the second processor, each performing initial image processing on image frames generated by the respective image sensors, thereby reducing image transmission bandwidth, wherein the initial image processing comprises at least one of auto exposure, auto white balance and/or demosaicing.

8. The system of claim 1, wherein the first submersible housing further wherein the first and second processor are each configured to perform initial image processing on data from its respective image sensor before transmitting the data to the computer system, thereby reducing bandwidth requirements.

9. The system of claim 1, further comprising:

an image model generator module that generates a three-dimensional model of an underwater environment based on image data captured by the first image sensor and the second image sensor.

10. The system of claim 9, wherein the system is integrated with an underwater vehicle, and the computer system is further configured to provide navigation data to the vehicle based on the generated three-dimensional model.

11. The system of claim 1, wherein the synchronization module is configured to synchronize image frames depicting the underwater environment by:

selecting an initial image frame from the first set of image frames obtained by the first camera and an initial image frame from the second set of image frames obtained by the second camera that share an identical time stamp or have at least amount of time difference between a respective time stamp of an image frame to form a base pair of image frames;

determining an image offset number based on the base pair of image frames; and matching in serial order subsequent image frames after the initial image frame from the first set of image frames with subsequent image frames after the initial image frame from the second set of image frames based on the image offset number to create a set of matched image frame pairs.

12. A method of operating underwater stereo imaging system, comprising the operations:

operating the underwater stereo imaging system comprising:

a first camera comprising:

a first submersible housing;

a first image sensor disposed within the first submersible housing;

a first processor;

a first clock; and a first corrective optic system;

a second camera comprising:

a second submersible housing;

a second image sensor disposed within the second submersible housing;

a second processor;

a second clock; and a second corrective optic system; and a common voltage bus;

wherein the first camera and the second camera are arranged in a fixed stereo baseline;

wherein both the first camera and the second camera share the common voltage bus that when a predetermined voltage is applied, from a source other than the first camera and the second camera, to the common voltage bus triggers both the first image sensor and the second image sensor to generate an image;

wherein each of the first corrective optic system and second corrective optic system are each a water-contactable optical element that optically corrects for underwater field distortion and chromatic aberration; and initiating a plurality of periodic voltages to be provided to the common voltage bus;

in response to the initiated plurality of periodic voltages, obtaining a first set of image frames by the first camera and a second set of image frames by the second camera; and synchronizing the first set of image frames with the second set of image frames after the first set of image frames and the second set of image frames have been obtained by the first image sensor and the second image sensor.

13. The method of claim 12, wherein the underwater stereo imaging system further comprises:

a controller comprising:

a submersible housing;

a third processor disposed within the third submersible housing;

an image storage repository disposed within a third submersible housing;

wherein the first camera and second camera are communicatively wired to the controller;

wherein the controller performs the operations of:

initiating the plurality of periodic voltages to the common voltage bus;

receiving the first set of image frames and the second set of image frames; and synchronizing the first set of image frames with the second set of image frames.

14. The method of claim 12, wherein synchronizing the first set of image frames with the second set of image frames comprises:

pairing an image frame from the first set of image frames obtained by the first camera, with an image frame from a second set of image frames obtained by the second camera; and matching in serial order subsequent image frames after the image frame from the first set of image frames with subsequent image frames after the image frame from the second set of image frames, thereby creating a set matched image frame pairs.

15. The method of claim 14, further comprising generating a stereo image for each of the set of matched image frame pairs.

16. The method of claim 12, further comprising:

initializing the first clock and the second clock to a same time.

17. The method of claim 12, wherein the first submersible housing and the second submersible housing are fixed to a mounting bracket that holds the first camera and the second camera in the fixed stereo baseline, and wherein the first submersible housing and the second submersible housing mounted to a portion of an underwater vehicle.

18. The method of claim 12, further comprising:

performing initial image processing on image frames generated by the respective image sensors, thereby reducing image transmission bandwidth and/or computation, wherein the initial image processing comprises at least one of auto exposure, auto white balance and/or demosaicing.

19. The method of claim 12, further comprising:

performing initial image processing by both the first image sensor and the second image sensor on generated image data before transmitting the generated image data to a separate device, thereby reducing bandwidth requirements by reducing the pixel size and/or image file size of the generated image data.

20. The method of claim 12, further comprising:

generating a three-dimensional model, via an image generator, of an underwater environment based on the first set of image frames and the second set of image frames.

21. The method of claim 20, further comprising:

providing navigational data to an underwater vehicle based on the based on the generated three-dimensional model.

22. The method of claim 12, wherein synchronizing comprises:

selecting an initial image frame from the first set of image frames obtained by the first camera and an initial image frame from the second set of image frames obtained by the second camera that share an identical time stamp or have at least amount of time difference between a respective time stamp of an image frame to form a base pair of image frames;

determining an image offset number based on the base pair of image frames; and matching in serial order subsequent image frames after the initial image frame from the first set of image frames with subsequent image frames after the initial image frame from the second set of image frames based on the image offset number to create a set of matched image frame pairs.

* * * * *